(12) United States Patent
Gao

(10) Patent No.: US 10,515,520 B2
(45) Date of Patent: Dec. 24, 2019

(54) INTELLIGENT XENON FLASH TUBE WARNING LAMP

(71) Applicant: Ningbo Kaishuo Lighting Technology Co., Ltd., Yuyao, Zhejiang Province (CN)

(72) Inventor: Yanhua Gao, Yuyao (CN)

(73) Assignee: Ningbo Kaishuo Lighting Technology Co., Ltd., Yuyao (CN)

( * ) Notice: Subject to any disclaimer, the term of this patent is extended or adjusted under 35 U.S.C. 154(b) by 0 days.

(21) Appl. No.: 15/879,785

(22) Filed: Jan. 25, 2018

(65) Prior Publication Data

US 2018/0350202 A1   Dec. 6, 2018

(30) Foreign Application Priority Data

Jun. 6, 2017  (CN) .......................... 2017 1 0419103

(51) Int. Cl.
| | |
|---|---|
| *G08B 5/00* | (2006.01) |
| *G06K 9/00* | (2006.01) |
| *F41G 3/00* | (2006.01) |
| *F41H 9/04* | (2006.01) |
| *G08B 13/196* | (2006.01) |

(52) U.S. Cl.
CPC ............... *G08B 5/002* (2013.01); *F41G 3/00* (2013.01); *F41H 9/04* (2013.01); *G06K 9/00255* (2013.01); *G06K 9/00288* (2013.01); *G08B 13/196* (2013.01)

(58) Field of Classification Search
CPC .. B64C 39/024; G08B 5/002; G06K 9/00288; F41H 9/04; F41H 9/10; F41G 3/00
See application file for complete search history.

(56) References Cited

U.S. PATENT DOCUMENTS

| | | | | |
|---|---|---|---|---|
| 5,490,050 | A * | 2/1996 | Clark | .................. F21L 15/04 362/200 |
| 8,055,886 | B2 * | 11/2011 | Tashiro | .................. G06F 9/3016 712/241 |
| 9,082,235 | B2 * | 7/2015 | Lau | ......................... G07C 9/00 |
| 9,643,722 | B1 * | 5/2017 | Myslinski | ............. B64C 39/024 |
| 9,697,721 | B1 * | 7/2017 | Akuoku | ............. H04M 1/72538 |
| 9,779,598 | B2 * | 10/2017 | DiPoala | ........... G08B 13/19619 |
| 2015/0133072 | A1 * | 5/2015 | Jang | .................. H04M 1/72536 455/404.1 |

(Continued)

*Primary Examiner* — Joshua T Semick
(74) *Attorney, Agent, or Firm* — Banner & Witcoff, Ltd.

(57) ABSTRACT

Embodiments described herein may provide an intelligent warning lamp that provides image recognition features using an image capture device and a target analysis device offering high-precision results. The target analysis device may perform facial recognition on a detected human in a surrounding image to obtain a facial feature, and match the obtained facial feature with features of a known target. For example, in a law enforcement application, the intelligent warning lamp may match facial features of people nearby a police car with a known criminal. If the match is found, a successful identification signal may be issued with information about the target. The intelligent warning lamp may include an automated deterrent system. The intelligent warning lamp may operate to determine a relative position of the target based on the image data, and may eject a deterrent in the direction of the target using the ejection driving device.

11 Claims, 1 Drawing Sheet

(56) References Cited

U.S. PATENT DOCUMENTS

| | | | |
|---|---|---|---|
| 2016/0004564 A1* | 1/2016 | Park | G06F 9/4868 |
| | | | 718/104 |
| 2017/0039413 A1* | 2/2017 | Nadler | G06K 9/6201 |
| 2018/0093284 A1* | 4/2018 | Harris | B64C 1/061 |
| 2018/0101811 A1* | 4/2018 | Mattingly | G05D 1/0088 |
| 2018/0113452 A1* | 4/2018 | Wiechers | B60R 25/01 |
| 2018/0157259 A1* | 6/2018 | Myslinski | G08B 21/18 |

* cited by examiner

INTELLIGENT XENON FLASH TUBE WARNING LAMP

This application claims priority to Chinese Patent Application no. 201710419103.5, entitled "INTELLIGENT XENON FLASH TUBE WARNING LAMP," filed in China on Jun. 6, 2017, by applicant Ningbo Kaishuo Lighting Technology Co., Ltd., the full disclosure of which is herein incorporated by reference.

FIELD OF USE

Aspects of the disclosure relate generally to warning lamps, such as xenon flash tube warning lamps. More specifically, aspects of the disclosure may provide an intelligent xenon flash tube warning lamp.

BACKGROUND

As the name suggests, a warning lamp serves the role of warning observers to dangers and providing other reminders. Such lamps are typically used in road safety applications, helping to reduce traffic accidents and warn drivers of potential hidden dangers. Warning lamps may be incorporated in vehicles and equipment. For example, emergency vehicles such as police cars, fire engines, and ambulances may include warning lamps. Other examples include road maintenance vehicles, construction vehicles, tractors, and other vehicles that operate in areas where it is beneficial to provide warning of some condition to observers. And warning lamps may be included in related machines and equipment.

Warning lamps on a vehicle may come in different lengths depending on the type of vehicle and the particular applications involved. A warning lamp may include a structure with a lampshade assembly, and a side of the lampshade may be designed with a combination of colors as needed. Warning lamps may incorporate several different light sources, such as shift bulbs, LED flash, xenon lamp strobes, and the like. Each has different features, and may lend itself to different applications. For example, LED flash is an upgraded version of the shift bulb and offers longer service life, better power saving, and less heat.

The use of the warning lamp may have a significant effect when used properly. For example, a construction vehicle may light up the warning lamp during a road construction project, particularly in the unclear road conditions at nighttime. Accidents may occur easily in such road conditions, and people unaware of the situation may be prone to accidents or cause traffic congestion. A warning lamp on a construction vehicle may inform drivers encountering the project and may reduce these problems. Similarly, a warning lamp may be useful to cars and other vehicles during extended driving. During such trips, drivers who encounter problems may choose to stop and pull-over to the side of the road. The drivers may set up a danger warning lamp behind the vehicle to ensure safety and alert other travelers to watch out for the obstacle, so as to slow down and drive safely. A good warning lamp may offer an expanded visible range of the danger warning sign and provide suitable warning to other drivers at distance. Thus, it may be beneficial to use a warning lamp.

An emergency siren is one type of warning lamp. Emergency vehicles, such as police cars, fire engines, ambulances, and the like, carrying out a mission may use a siren to alert other drivers and indicate that they may drive without following the limitation of traffic lights or even drive in an opposite lane. Pedestrians and vehicles in the vicinity are generally obliged to give way to emergency vehicles in this situation. Emergency vehicles are typically required to install a legally issued siren, or be subject to certain penalties.

In addition, a police car in the process of handling an emergency case may use the siren not just to clear the way in driving to the scene of crime, but also to scare away criminal suspects. Since an emergency case occurs so suddenly without any warning, a policeman rushing to the scene of a crime has limited information about the operation and situation. As one purpose of the police action may be to minimize the loss caused by such an event, the siren may serve to limit further criminal activity. As a blind pursuit of a criminal suspect on the spot may have a lower likelihood of success, this result may be desirable.

For example, when a police command center receives a report on an armed robbery, the situation may not allow the police to try and sneak up and arrest the subject. Such actions may allow the suspect time to complete a crime in progress, flee the scene, or further endanger bystanders before the police car arrives. In general, these risks may be deemed too significant a cost to capture the criminal. Thus, a siren warning lamp may be used to alert and scare the criminal suspect, and the criminal conduct of the suspect can be stopped effectively while further harm is minimized. Although it may be more difficult to capture the criminal afterward, it is typically deemed better than risking an innocent human life.

Conventional warning lamps as described above are simple devices and do not include advanced features. Sirens and other warning lamps may offer various lighting controls, but generally do not offer intelligent features such as image recognition in surrounding areas. The prevalence of warning lamps on vehicles, such as emergency vehicles, may be leveraged to provide advanced functionality in common warning lamp usage scenarios. For example, aspects described herein may provide improved functionality in a law enforcement scenario, assisting a user in recognizing a target and automatically ejecting a deterrent in the direction of the target.

SUMMARY

Aspects described herein may provide an improved, intelligent warning lamp that offers advanced features suitable for use in some situations where warning lamps would be used. For example, aspects described herein may leverage image capture and computer processing features, in coordination with the warning lamp, to recognize a target in a law enforcement scenario. These features may further allow the system to automatically eject a deterrent in the direction of the target, according to positioning data determined by the intelligent warning lamp. Warning lamps incorporating a xenon flash tube type of light source may provide additional advantages in this application. These features may find particular use in emergency vehicles and law enforcement applications.

Embodiments described herein may provide an intelligent warning lamp that provides image recognition features using an image capture device and a target analysis device offering high-precision results. The image capture device may capture an image of the scene surrounding the intelligent warning lamp. The target analysis device may perform facial recognition on a detected human in the surrounding image to obtain a facial feature, and match the obtained facial feature with features of a known target. For example, in a law enforcement application, the intelligent warning lamp may match facial features of people nearby a police car with a known criminal. If the match is found, then a successful identification signal may be issued with information about the target. The intelligent warning lamp may include an automated deterrent system. For example, the deterrent system may incorporate deterring gas, such as tear gas, and may comprise a storage can, a gas ejector, and an ejection driving device. The intelligent warning lamp may operate to determine a relative position of the target based on the image data, and may eject a deterrent in the direction of the target in the image data using the ejection driving device.

Accordingly, some aspects may provide an intelligent warning lamp. The intelligent warning lamp may comprise a warning lamp body. In some embodiments, the intelligent warning lamp may comprise a xenon flash tube light source. The intelligent warning lamp may further comprise a storage can configured to store a deterrent substance and a gas ejector configured to extract the deterrent substance from the storage can and eject the deterrent substance in a direction of a target. The deterrent substance, in some implementations, may be tear-gas liquid. The intelligent warning lamp may further comprise an ejection driving device configured to cause the ejection of the deterrent substance in the direction of the target based on direction control information. The direction control information may comprise an ejection direction. The intelligent warning lamp may further comprise an image capture device, which may comprise a plurality of image sensors configured to obtain a panoramic image.

The intelligent warning lamp may further comprise a computer processor coupled to the ejection driving device and configured to process the panoramic image to determine whether features of a subject in the panoramic image match features of the target. Based on determining that the features of a subject match the features of the target, the computer processor may generate direction control information comprising an ejection direction and provide the direction control information to the ejection driving device. In some implementations, the computer processor may be a processor based on the ARM processor architecture. For example, the computer processor may be a Corex-A15 computer processor designed by ARM Holdings.

In some implementations, the intelligent warning lamp may further comprise a target analysis device coupled to the image capture device. The target analysis device may be configured to receive subject image information from the image capture device and perform facial recognition on the subject image information to obtain subject facial features. The target analysis device may compare the subject facial features to target facial features to determine a match. If a match is found, the target analysis device may generate a successful identification signal and output information identifying attributes of the target. The target analysis device may determine the ejection direction based on a relative position of a matching subject in the subject image information. If a match is not found, the target analysis device may generate a recognition failure signal.

The computer processor may be configured to confirm a target match of the target analysis device when receiving the successful identification signal. In response to confirming the target match, the computer processor may operate the ejection driving device to cause ejection of the deterrent substance based on the direction control information. When receiving the recognition failure signal, the computer processor may operate the ejection driving device to cease ejection of the deterrent substance.

According to some aspects, an intelligent xenon flash tube warning lamp may be provided comprising a storage can, a gas ejector, an ejection driving device, a xenon flash tube warning lamp body, an image capturing device, and a Cortex-A15 processor, where the storage can is provided for pre-storing a tear-gas liquid, and the gas ejector is coupled to the storage can and provided for sucking the tear-gas liquid out from the storage can to perform a directional ejection, and the image capturing device comprises four image sensors embedded around the xenon flash tube warning lamp body, and the image capturing device combines images outputted by the four image sensors respectively to obtain a panoramic image, and the Cortex-A15 processor is coupled to the ejection driving device and provided for confirming the direction control information sent to the ejection driving device according to an image analysis result of the panoramic image; wherein the direction control information comprises an ejection direction, and after the ejection driving device receives the ejection direction, the tear-gas liquid in the storage can is sucked out to perform the directional ejection according to the ejection direction.

In some implementations, the ejection driving device may comprise a jet tilt head, and a gas nozzle installed to the jet tilt head, and after the jet tilt head receives the ejection direction, the jet tilt head may perform a corresponding rotation according to the ejection direction to drive the gas nozzle to eject a tear gas in the ejection direction.

In some implementations, the image capturing device may comprise an image merge device coupled to the four image sensors; wherein the image merge device is provided for receiving the images outputted from the four image sensors respectively and merging the images outputted from the four image sensors to obtain a panoramic image.

In some implementations, an intelligent xenon flash tube warning lamp may further comprise: a contrast enhancement device, coupled to the image capturing device, for receiving the panoramic image, and performing a contrast enhancement of the panoramic image to obtain the enhanced image; a Wiener filter device, coupled to the contrast enhancement device, for receiving the enhanced image, and executing a Wiener filter processing of the enhanced image to obtain a filtered image; an area detection device, coupled to the filtered image, for executing a human target detection of the filtered image to obtain each human sub-image according to a predetermined human feature, confirming a primitive area of each human sub-image according to the primitive area of each target and the total primitive area of the filtered image to confirm an area coverage ratio of each target; a depth-of-field detection device, coupled to the area detection device, for confirming the depth of field of each target corresponding to each human sub-image, and confirming a physical area of each target according to the area coverage ratio and the depth of field of each target; an image screening device, coupled to the depth-of-field detection device, for screening each target with a physical area smaller than or equal to a first area threshold in the filtered image to obtain a screened image; an image re-screening device, coupled to the depth-of-field detection device, for screening each target with a physical area smaller than or equal to a second area threshold in the filtered image to obtain a re-screened image; wherein the second area threshold is greater than the first area threshold; a target capture device, coupled to the image screening device and the image re-screening device, for subtracting the screened image from the re-screened image to obtain a differentiated image, and using a human sub-image corresponding to the remaining target of the differentiated image as an output of a final human sub-image; a target analysis device, coupled to the target capture device, for receiving the final human sub-image, performing a face recognition of the final human sub-image to obtain a target facial feature, matching the target facial feature with each criminal face image feature, sending out a successful identification signal for a match, outputting a criminal's name corresponding to the criminal face image feature, and confirming the ejection direction of a relative position of the differentiated image according to the final human sub-image, and if all matches fail, sending out a recognition failure signal; wherein, the Cortex-A15 processor is coupled to the target analysis device, for turning on the ejection driving device when receiving the successful identification signal, and ending the ejection direction to the ejection driving device, or turning off the ejection driving device when receiving the recognition failure signal.

In some implementations, the target analysis device may confirm an instant distance of the final human sub-image with respect to the distance of the human target from the warning lamp according to the depth of field of the final human sub-image in the differentiated image with respect to the human target in a successful match. The Cortex-A15 processor may be provided for adjusting the ejection intensity sent to the ejection driving device according to the instant distance when the successful identification signal is received. The gas nozzle of the ejection driving device may receive the ejection intensity and eject a tear gas towards the ejection direction according to the ejection intensity.

In some implementations, the storage can may comprise a liquid level detection device for detecting the current liquid level of the tear-gas liquid in the storage can. A liquid level detection warning light may be installed onto the storage can and coupled to the liquid level detection device and provided for carrying out a corresponding light warning operation when the current liquid level of the tear-gas liquid in the storage can is smaller than or equal to the predetermined liquid level threshold.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to an intelligent warning lamp that provides image recognition features using an image capture device and a target analysis device offering high-precision results. The image capture device may capture an image of the scene surrounding the intelligent warning lamp. The target analysis device may perform facial recognition on a detected human in the surrounding image to obtain a facial feature, and match the obtained facial feature with features of a known target. For example, in a law enforcement application, the intelligent warning lamp may match facial features of people nearby a police car with a known criminal. If the match is found, then a successful identification signal may be issued with information about the target. The intelligent warning lamp may include an automated deterrent system. For example, the deterrent system may incorporate deterring gas, such as tear gas, and may comprise a storage can 1, a gas ejector 2, and an ejection driving device 3 (referring to FIG. 1). The intelligent warning lamp may operate to determine a relative position of the target based on the image data, and may eject a deterrent in the direction of the target in the image data using the ejection driving device 3.

Figure 1:
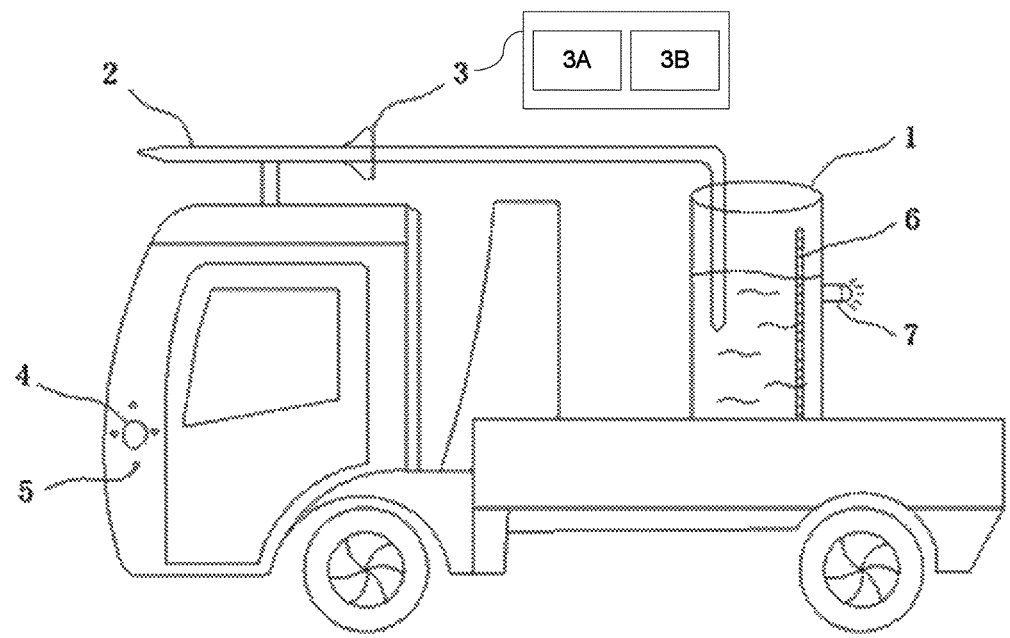
FIGS. 1 and 2 illustrate the structure of an intelligent xenon flash tube warning lamp in accordance with one or more illustrative aspects discussed herein.

FIG. 1 illustrates a schematic block diagram showing the structure of an intelligent xenon flash tube warning lamp in accordance with some aspects described herein. The illustrated system comprises a storage can 1, a gas ejector 2, an ejection driving device 3, a xenon flash tube warning lamp body 4, image capturing components 5, and a computer processor 15 (illustrated in FIG. 2). The specific structure of the intelligent xenon flash tube warning lamp of FIG. 1 is described further below.

Storage can 1 may be configured to store a deterrent substance, and may be coupled to gas ejector 2 and ejection driving device 3. Storage can 1 may store any suitable deterrent substance, such as tear-gas liquid. Gas ejector 2 may extract the deterrent substance from storage can 1 and perform a directional ejection of the deterrent substance. Ejection driving device 3 may operate to control ejection of the deterrent substance, as further detailed herein.

Image capturing components 5 may comprise an image capture device. The image capture device may comprise a plurality of image sensors. For example, the image capture device may comprise four image sensors arrayed so as to cover the area surrounding xenon flash tube warning lamp body 4. Images from the image sensors may be combined to obtain a panoramic image surrounding the intelligent xenon flash tube warning light.

Computer processor 15 (illustrated in FIG. 2) may be coupled to the ejection driving device 3, the image capture components 5, and the xenon flash tube warning light body 4. Computer processor 15 may be a processor implementing the ARM processor architecture. For example, computer processor 15 may be a Corext-A15 processor designed by ARM Holdings. Computer processor 15 operates to process the panoramic image to determine the presence of a human subject matching features of a known target. Upon determining and confirming the presence of a matching target, computer processor 15 may operate the deterrent system via ejection driving device 3 to eject a deterrent substance in the direction of the target by determining direction control information and sending the direction control information to ejection driving device 3. The direction control information may comprise an ejection direction, and the ejection driving device 3 may cause the deterrent substance to be ejected based on the ejection direction. For example, the intelligent xenon flash tube warning lamp may be operated to identify a known criminal suspect. Using the criminal suspect as the known target, the intelligent xenon flash tube warning lamp may identify the criminal subject (based on visual features of the criminal subject) in the panoramic image and determine control information to control ejection of the deterrent substance in the direction of the criminal subject.

The ejection driving device 3 may comprise a jet tilt head 3A, and a gas nozzle 3B installed to the jet tilt head 3A, and after the jet tilt head 3A receives the ejection direction, the jet tilt head 3A may perform a corresponding rotation according to the ejection direction to drive the gas nozzle 3B to eject a tear gas in the ejection direction.

Figure 2:
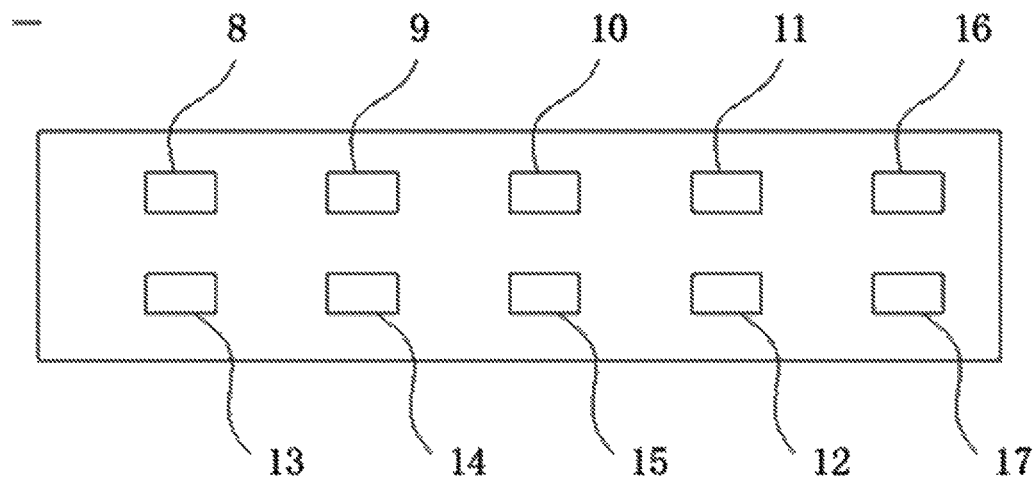

FIG. 2 illustrates additional components of the intelligent xenon flash tube warning light. The image capturing components 5 may comprise an image merge device 8 coupled to the plurality of image sensors. The image merge device 8 may receive the images outputted from the four image sensors respectively and merge the images outputted from the four image sensors to obtain a panoramic image.

Computer processor 15 may operate to confirm a target match in the panoramic image. A target analysis device 13 may be included in the intelligent xenon flash tube warning lamp to analyze image data from the image sensors to generate target match information. In some implementations, the target analysis device 13 may perform its image recognition process in coordination with a series of components, described in detail further below.

A contrast enhancement device 14 may be coupled to the image capturing device for receiving the panoramic image, and performing a contrast enhancement of the panoramic image to obtain the enhanced image.

A Wiener filter device 9 may be coupled to the contrast enhancement device 14 for receiving the enhanced image and executing a Wiener filter processing of the enhanced image to obtain a filtered image.

An area detection device 10 may be coupled to the Wiener filter device 9 for executing a human target detection of the filtered image to obtain each human sub-image according to a predetermined human feature, confirming a primitive area of each human sub-image according to the primitive area of each target and the total primitive area of the filtered image to confirm an area coverage ratio of each target.

A depth-of-field detection device 11 may be coupled to the area detection device 10 for confirming the depth of field of each target corresponding to each human sub-image, and confirming a physical area of each target according to the area coverage ratio and the depth of field of each target.

An image screening device 16 may be coupled to the depth-of-field detection device 11 for screening each target with a physical area smaller than or equal to a first area threshold in the filtered image to obtain a screened image.

An image re-screening device 17 may be coupled to the depth-of-field detection device 11 for screening each target with a physical area smaller than or equal to a second area threshold in the filtered image to obtain a re-screened image, wherein the second area threshold is greater than the first area threshold.

A target capture device 12 may be coupled to the image screening device 16 and the image re-screening device 17 for subtracting the screened image from the re-screened image to obtain a differentiated image, and using a human sub-image corresponding to the remaining target of the differentiated image as an output of a final human sub-image.

A target analysis device 13 may be coupled to the target capture device 12 for receiving the final human sub-image, performing a face recognition of the final human sub-image to obtain a target facial feature, matching the target facial feature with each criminal face image feature, sending out a successful identification signal for a match, outputting a criminal's name corresponding to the criminal face image feature, and confirming the ejection direction of a relative position of the differentiated image according to the final human sub-image, and if all matches fail, sending out a recognition failure signal.

The computer processor 15 may be coupled to the target analysis device 13. The computer processor 15 may turn on the ejection driving device 3 when receiving the successful identification signal, and may end transmission of the ejection direction to the ejection driving device, and/or turn off the ejection driving device 3 when receiving the recognition failure signal.

The target analysis device 13 may confirm an instant distance of the final human sub-image with respect to the distance of the human target from the warning lamp according to the depth of field of the final human sub-image in the differentiated image with respect to the human target in a successful match. The computer processor 15 may adjust the ejection intensity sent to the ejection driving device 3 according to the instant distance when the successful identification signal is received. The gas nozzle of the ejection driving device 3 may receive the ejection intensity and eject a tear gas towards the ejection direction according to the ejection intensity.

According to some aspects, returning to FIG. 1, the storage can 1 may comprise a liquid level detection device 6 for detecting the current liquid level of the tear-gas liquid in the storage can. A liquid level detection warning light 7 may be installed onto the storage can 1 and coupled to the liquid level detection device 6 and provided for carrying out a corresponding light warning operation when the current liquid level of the tear-gas liquid in the storage can 1 is smaller than or equal to the predetermined liquid level threshold.

A digital signal processing (DSP) chip may be used to implement the target analysis device 13 (returning to FIG. 2). The interior of the DSP chip may adopt the Harvard structure with the program and data separated from one another and have a dedicated hardware multiplier. Such DSP chips utilize pipeline operations and support specific and well-known DSP commands, such that the DSP chip can be used to implement various different digital signal processing algorithms quickly.

According to digital signal processing requirements, a DSP chip generally has the following features: (1) Multiplication and addition can be completed in a command cycle. (2) Program and data spaces are separated, so that both command and data can be accessed simultaneously. (3) The DSP chip has a fast RAM installed therein, so that both commands and data can be accessed through an independent data bus. (4) The DSP chip has a hardware support with low-overhead or no-overhead loop and jumps. (5) The DSP provides a quick interrupt and hardware I/O support. (6) The DSP chip has a plurality of hardware address generator operated in a single cycle. (7) The DSP chip can execute a plurality of operations. (8) The DSP supports pipeline operations, so that the operation including fetch, decode, and execution can be carried out in an overlapped manner.

The DSP chips can be divided according to the data format used for the operation of the chip. A DSP chip using a fixed-point data format for the operation is called a fixed-point DSP chip, such as Texas Instrument's TMS320C1X/C2X, TMS320C2XX/C5X, TMS320C54X/C62XX series, Analog Device's ADSP21XX series, AT&T's DSP16/16A, Motorola's MC56000, etc. A DSP chip using a floating-point data format for the operation is called a floating-point DSP chip such as TI's TMS320C3X/C4X/C8X, AD's ADSP21XXX series, AT&T's DSP32/32C, Motorola's MC96002, etc. Different floating-point DSP chips adopt different floating-point data formats, and some DSP chips such as TMS320C3X adopt a self-defined floating-point format, while some DSP chips such as Motorola's MC96002, Fujitsu's MB86232, Zoran's ZR35325, etc adopt IEEE floating-point format.

Compared with the conventional warning lamps, aspects of the disclosure may provide improved and advance functionality increasing the utility of the warning lamp. Intelligent warning lamps, as described herein, add a storage can, a gas ejector, and an ejection driving device to the hardware structure of the conventional warning lamp. The additional inclusion of a panoramic image collection mechanism and targeted image recognition mechanisms may provide for the recognition and positioning of nearby criminals. And the gas ejection can and the ejection driving device may eject a gas to nearby criminals based on confirmation of the recognition and positioning of the criminals, so as to reduce the manual work of a police officer and improve the functionality of conventional warning lamps.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

PARTS LIST

FIG. 1: Car with warning lamp
1. A storage Can
2. A gas Ejector
3. An ejection Driving Device
4. A xenon flash tube warning lamp body
5. Image capturing components
6. A liquid level detection device
7. A liquid level detection warning light
FIG. 2: Dashboard of police car
8. An image merge device
9. A Wiener filter device
10. An area detection device
11. A depth-of-field detection device
12. A target capture device
13. A target analysis device
14. A contrast enhancement device
15. A Cortex-A15 processor
16. An image screening device
17. An image re-screening device

What is claimed is:

1. An intelligent warning lamp, comprising:
a warning lamp body;
a storage can configured to store a deterrent substance;
a gas ejector configured to extract the deterrent substance from the storage can and eject the deterrent substance in a direction of a target;
an ejection driving device, comprising a jet tilt head and a gas nozzle coupled to the jet tilt head, configured to cause the ejection of the deterrent substance in the direction of the target based on direction control information comprising an ejection direction;
an image capture device, comprising a plurality of image sensors and an image merge device, configured to capture a panoramic image, wherein the image merge device is configured to receive images output from the plurality of image sensors and merge the images to generate the panoramic image;
a computer processor coupled to the ejection driving device and image capture device; and
memory storing instructions that, when executed by the computer processor, cause the computer processor to:
obtain the panoramic image from the image capture device;
process the panoramic image to determine whether features of a subject in the panoramic image match features of the target;
generate, based on determining that the features of the subject match the features of the target, the direction control information comprising the ejection direction; and
provide the direction control information to the ejection driving device; and
a target analysis device, implemented using a digital signal processing (DSP) chip and coupled to the image capture device, wherein the DSP chip stores a program that, when executed, causes the target analysis device to:
receive subject image information from the target image capture device;
perform a face recognition of the subject image information to obtain a subject facial feature corresponding to a subject in the subject image information;
match the subject facial feature with the features of the target;
generate a successful identification signal based on determining a match of the subject facial feature with the features of the target, or a recognition failure signal if matching fails;
output information identifying attributes of the target, if a match is successful; and
determine the ejection direction based on a relative position of the subject in the subject image information, if a match is successful; and
wherein the jet tilt head is configured to perform, after the ejection driving device receives the ejection direction from the computer processor, a corresponding rotation based on the ejection direction to orient the gas nozzle to eject the deterrent substance in the ejection direction, and
wherein the instructions, when executed by the computer processor, further cause the computer processor to:
based on receiving the successful identification signal, confirm the target match in the panoramic image and cause the ejection driving device to eject the deterrent substance; and
based on receiving the recognition failure signal, cause the ejection driving device to cease ejection of the deterrent substance.

2. The intelligent warning lamp of claim 1, further comprising:
a xenon flash tube light source.

3. The intelligent warning lamp of claim 1, wherein the computer processor utilizes an Advanced Reduced Instruction Set Computer (RISC) Machine (ARM) processor architecture.

4. The intelligent warning lamp of claim 3, wherein the computer processor is a Cortex-A15 processor.

5. The intelligent warning lamp of claim 1, wherein the deterrent substance comprises tear-gas liquid.

6. The intelligent warning lamp of claim 1, wherein the image capture device comprises four image sensors.

7. The intelligent warning lamp of claim 1, wherein the instructions, when executed, cause the computer processor to adjust an ejection intensity sent to the ejection driving device based on an instance distance when the successful identification signal is received.

8. The intelligent warning lamp of claim 7, wherein the ejection driving device is configured to receive the ejection intensity and control ejection of the deterrent substance based on the ejection intensity.

9. The intelligent warning lamp of claim 1, wherein the storage can comprises a liquid level detector for detecting a current level of the deterrent substance in the storage can.

10. The intelligent warning lamp of claim 9, further comprising a liquid level detection warning light coupled to the liquid level detector and configured to indicate a warning when the current level of the deterrent substance in the storage can is less than or equal to a predetermined liquid level threshold.

11. The intelligent warning lamp of claim 1, wherein the DSP chip adopts a Harvard structure with the program and data separated from one another and has a dedicated hardware multiplier and a fast RAM installed therein and a plurality of hardware address generators operated in a single cycle, and wherein the DSP chip utilizes pipeline operations.

* * * * *